E. A. GOODES.
Weighing and Measuring Cup.
No. 70,546.
Patented Nov. 5, 1867.
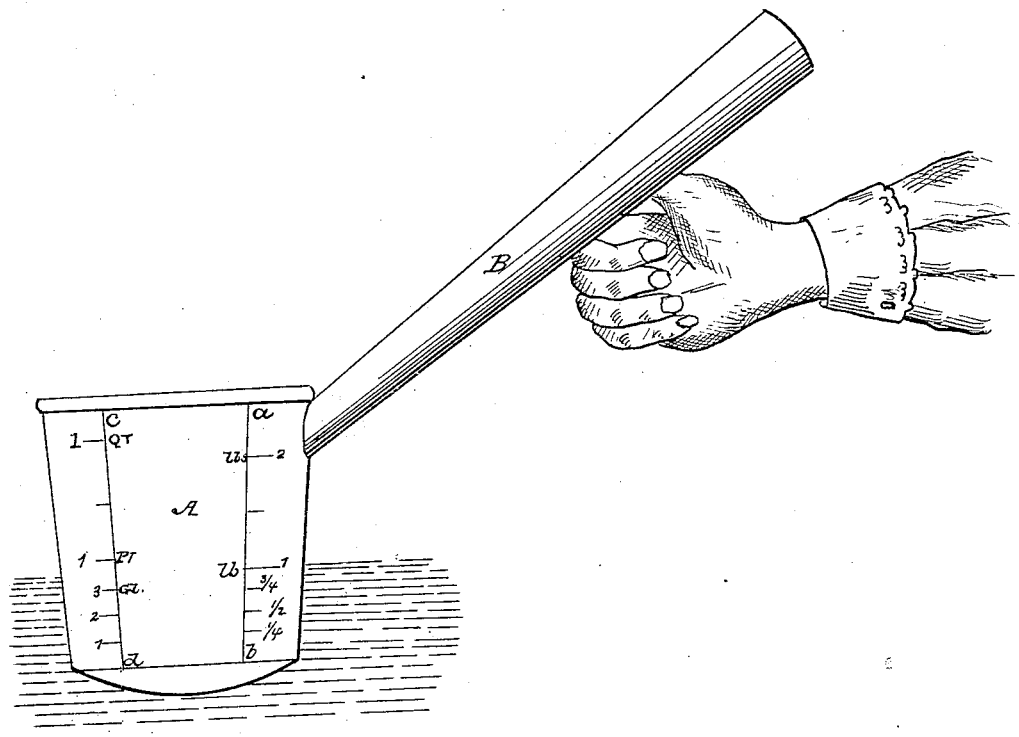

United States Patent Office.

E. A. GOODES, OF PHILADELPHIA, PENNSYLVANIA, ASSIGNOR TO HIMSELF, E. L. MILLER, AND W. H. MORFORD, OF SAME PLACE.

Letters Patent No. 70,546, dated November 5, 1867.

IMPROVEMENT IN WEIGHING AND MEASURING-CUPS.

*The Schedule referred to in these Letters Patent and making part of the same.*

TO ALL WHOM IT MAY CONCERN:

Be it known that I, E. A. GOODES, of Philadelphia, in the county of Philadelphia, and State of Pennsylvania, have invented a new and improved Weighing and Measuring-Cup; and I do hereby declare that the following is a full, clear, and exact description of the same, reference being had to the accompanying drawing, making a portion of this specification, which is a side view of a cup or dipper made according to my invention.

This invention is designed more especially for household use, and its principal object is to provide a cheap and convenient means for ascertaining the weight of small quantities of flour, butter, and other like commodities; and to this end it consists in a cup provided with a scale at one side, in such manner that the cup, with the article to be weighed contained therein, being placed in a vessel of water, the depth to which the vessel sinks, and consequently the weight of the aforesaid article, will be indicated by the scale.

The invention further consists in constructing the cup with an additional scale, indicating, by measure, the quantity contained therein when only partially filled, whereby the device or utensil may not only be used for weighing, but also for measuring purposes.

To enable others to understand the nature and construction of my invention, I will proceed to describe it with reference to the drawing.

A represents a cup, of any appropriate form, and of sheet metal or any other suitable material, the said cup being provided, preferably, with a handle, B, after the manner of an ordinary dipper, as shown in the drawing. Formed or furnished in any suitable manner, in a vertical position upon one side of the cup A, is a scale, $a\ b$, so graduated and arranged that the cup, when empty, being placed in an upright position in a vessel of water, the depth to which it sinks will be indicated at the zero point or mark of the scale, and that the increased depth to which the said cup is depressed by each additional pound or fraction of a pound will be shown by a corresponding mark of the scale indicating such weight, the weight of the commodity in the cup being thus determined by the figures of the scale indicating the depth to which the cup is sunk in the water by the said weight, so that by this means any quantity suited to the capacity of the cup, of any substance or material, may be readily and conveniently weighed with tolerable accuracy.

It should be mentioned that when the cup is provided with a handle, as shown in the drawing, the end of the said handle should be allowed to rest either upon the hand of the person using the device, as shown in the drawing, or upon the edge of the vessel containing the water, in order to insure the retention of the cup in the required upright position while being used.

In order to enable the cup to be employed for measuring as well as weighing purposes, it is furnished with an additional scale, $c\ d$, the gradations of which indicate in quarts, pints, gills, etc., the quantity contained in the cup when filled, to a greater or less degree, or, in other words, to a greater or less distance from the top thereof; the said scale $c\ d$ being formed, preferably, by indenting the side of the cup, at suitable intervals, in such manner that the divisions thereof may be seen or examined from the interior of said cup.

What I claim as my invention, and desire to secure by Letters Patent, is—

A cup provided with scales $a\ b$ and $c\ d$, whereby it may be used for weighing and measuring purposes, in the manner substantially as herein set forth, as a new article of manufacture.

E. A. GOODES.

Witnesses:
　THOS. C. EBERT,
　JACOB HERITAGE.